United States Patent [19]

Conti et al.

[11] Patent Number: 4,606,481

[45] Date of Patent: Aug. 19, 1986

[54] DISPENSING CLOSURE FOR SPOUTED CONTAINER

[75] Inventors: Rino Conti, Stoughton, Mass.; Jody A. Trivision, Wooster, Ohio

[73] Assignee: Dart Industries, Northbrook, Ill.

[21] Appl. No.: 581,490

[22] Filed: Feb. 17, 1984

[51] Int. Cl.⁴ .............................................. B65D 47/00
[52] U.S. Cl. .................................. 222/562; 222/566; 220/354
[58] Field of Search ................ 222/566, 567, 23, 562, 222/544, 572; 220/352, 356, 354, 355; 215/316; 141/380, 381

[56] References Cited

U.S. PATENT DOCUMENTS

| D. 127,970 | 7/1941 | Myers | D58/8 |
|---|---|---|---|
| D. 196,275 | 9/1963 | Neal et al. | D58/26 |
| D. 199,461 | 10/1964 | Dailey | D58/8 |
| D. 258,037 | 1/1981 | Conti | D58/6 |
| 525,753 | 9/1894 | Turner | 141/381 |
| 608,103 | 7/1898 | Brown | 222/544 |
| 676,937 | 6/1901 | Crumrine | 222/562 |
| 1,895,759 | 1/1933 | Hagebusch | 222/566 |
| 1,987,055 | 1/1935 | Divol | 222/566 |
| 2,790,576 | 4/1957 | Lawrence | 220/356 |
| 2,840,124 | 6/1958 | Greene | 141/381 |
| 2,842,167 | 7/1958 | Tupper | 141/381 |
| 3,179,313 | 4/1965 | Malglaive | 222/562 |
| 3,259,279 | 7/1966 | Nojiri | 222/183 |
| 3,730,403 | 5/1973 | Piagnoli | 222/572 |
| 3,756,480 | 9/1973 | Swett et al. | 222/484 |

FOREIGN PATENT DOCUMENTS 637703 9/1963 Belgium .............................. 222/572

OTHER PUBLICATIONS

"Taiwan International Trade", publication; Aug. 1980 issue; item shown at lower right corner.

Primary Examiner—Joseph J. Rolla
Assistant Examiner—Kenneth Noland
Attorney, Agent, or Firm—A. Lewis Worthem, Jr.

[57] ABSTRACT

A storage container closure for a wide-mouthed spouted container having a cover which may be inverted to provide an intermediate spouted dispensing receptacle. The closure is particularly suited for neatly measuring and pouring a desired amount of loose material such as tea leaves or coffee grounds from the container into the cover and thereafter from the cover. The spout of the cover is complementary in shape to the spout of the container so that the cover may slip over the top of the container and close both the mouth and the spout of the container. Volume indicating means may be provided in the cover. A secondary three-part press type seal may be disposed within the container.

1 Claim, 13 Drawing Figures

DISPENSING CLOSURE FOR SPOUTED CONTAINER

BACKGROUND OF THE INVENTION

1. Field of the Invention

This invention relates to storage container closures and in particular to a closure for a spouted container having a cover which may be inverted to provide an intermediate spouted dispensing receptacle.

2. The Prior Art

It is a common practice to store materials in bulk in a container with periodic dispensing of portions of the material from the container. For example, in many households, tea leaves or coffee grounds are kept, and are dispensed in relatively small quantities to brew one or a few cups of beverage. Because a measured amount of leaves or grounds is needed for proper proportioning, an intermediate dispensing container is used to measure and transfer the desired quantity from storage to the brewing apparatus. Such intermediate containers have included measuring cups and spoons.

It is known in the prior art to provide containers for granular or liquid materials, such as grounds, detergents or medicaments, with necked cylindrical spouts and caps wherein the cap is removed and inverted to serve as a measuring container. Examples of such closure arrangements are disclosed in U.S. Pat. Nos. 2,840,124, 2,842,167 and 3,259,279. It is also known from U.S. Pat. No. D-199,461 to provide a cylindrical dispensing cup which, when inverted, slips over the top and upper extent of a cylindrical, capped bottle.

While known containers may be suitable for pouring and measuring their contents, they have been ill-adapted for being filled with granular or flaky material because of the restricted diameters of their openings. Materials of this consistency are difficult to direct in a concentrated flow without the use of a nozzle or funnel. While this problem may be prevented by using a wide-mouthed container, attempting to pour loose, particulate materials from a wide-mouthed container will usually result in the material pouring over a substantial portion of the container rim and spilling of some material outside the intended receptacle.

Thus, there is a need for a container which is easy to fill, easy to pour from, and which incorporates a closure forming an intermediate receptacle which is also easy to pour from. Furthermore, it is desirable for the receptacle to provide a complete cover for the container.

SUMMARY OF THE INVENTION

The present invention satisfies these needs by providing a wide-mouthed container with a spout opening formed in one side of the upper portion of the upright wall of the container and a similarly spouted cup-like cover complementary in shape to the upper extent of the container. The perimeter of the cover is slightly larger than the perimeter of the container so that the cover may slip over the top of the container and close both the mouth and the spout of the container.

When the cover is removed, it may be inverted to provide a spouted cup. The container contents may be neatly poured through the container spout into the cover until a desired quantity is dispensed. Then the material may be neatly poured from the cover through the cover spout into the end receptacle. In this manner the invention combines the advantages of a wide-mouthed container for filling, a spouted container for pouring, and a dual purpose cover/dispensing cup. By virtue of these features, the closure of the invention is well-suited for use with tea leaves, coffee grounds, and other loose materials.

According to the invention, the spouts of the container and cover comprise outwardly sloping portions of their upright walls and generally triangular spout side walls spanning from the upright walls to the sloping wall portions. The sloping wall portion of the cover closes the spout opening of the container, the triangular side walls of the cover overlie the triangular side walls of the container, and the upright wall or skirt of the cover surrounds the upper extent of the container upright wall.

According to an additional feature of the invention, the cover is provided with a volume indicating means comprising an inner circumferential shoulder. The shoulder rests atop the rim of the container when the container is closed. When the cover is inverted, the shoulder forms a horizontal line that indicates a predetermined volume.

According to a further feature of the invention, the container is provided with a secondary closure, substantially as described in U.S. Pat. No. 3,756,480. The secondary closure is a three-part press type seal having a depressable plunger and a distortable contractable sealing wall. The secondary closure seats atop a ledge formed about the inner circumference of the container disposed slightly below the container spout. This secondary closure provides added capability for preserving the freshness of the container contents.

Other features, objects, and advantages of the invention will become apparent from the following description of a preferred embodiment.

DESCRIPTION OF THE PREFERRED EMBODIMENT

Figure 1:
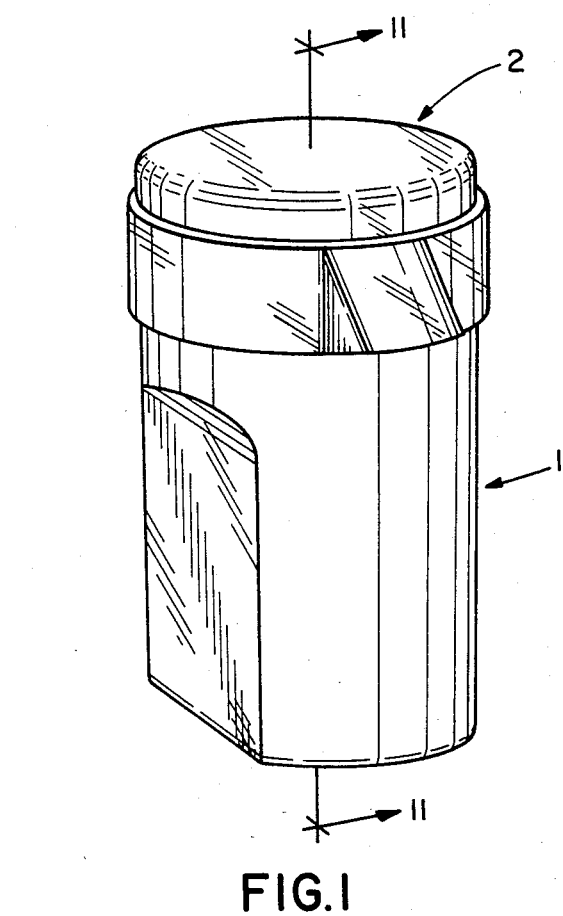
FIG. 1 is a perspective view of a closed container and cover combination embodying a closure according to the principles of the invention.
Figure 3:
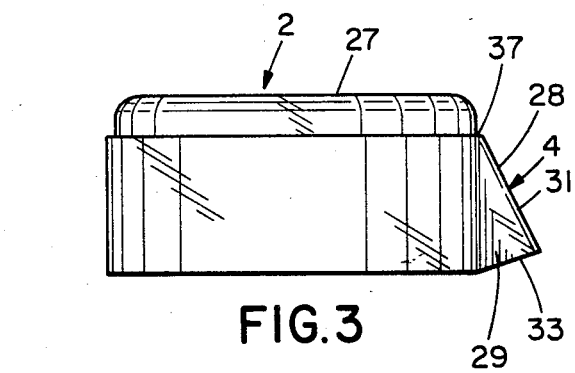
FIG. 3 is a side view of the cover of FIG. 1.
Figure 4:
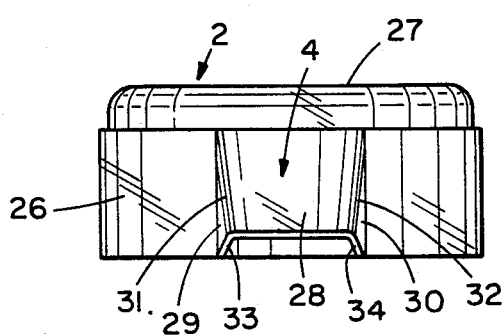
FIG. 4 is a front view of the cover.
Figure 5:
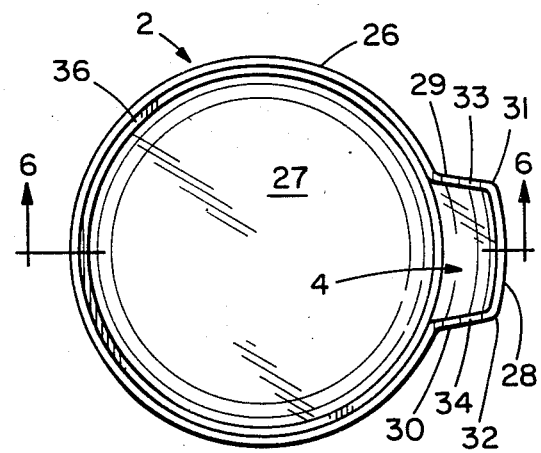
FIG. 5 is a bottom, inside view of the cover.

As shown in FIG. 1, the closure of the invention is embodied in a combination of a container 1 and a cover 2. As illustrated in FIGS. 7–10, the container 1 is generally cylindrical with a flat bottom 11 and a wide, generally circular top mouth opening circumscribed by a container rim 12. The upright container wall 13 is cylindrical in its upper extent and is interrupted by flat, opposed side panels 14, 15 in its lower extent.

A U-shaped notch is formed in the upper extent of the container wall 13 providing a container spout 3. This opening is bounded on its lower side by an outwardly projecting sloping portion 17 of the container wall and on its upright sides by two triangular wall extensions 18, 19 extending convergingly outwardly and downwardly merging with the sloping portion 17 along edges 20, 21, and having sloping outer edges 22, 23.

The cover 2, shown in FIGS. 3–6, has a circumferential, cylindrical skirt 26 and a generally flat top 27. In a fashion similar to the container 1, the cover 2 has a U-shaped notch formed in the skirt 26 forming a cover spout 4 bounded by an outwardly sloping portion 28 of the skirt 26 and two triangular skirt extensions 29, 30 converging outward by merging with the sloping portion 28 along edges 31, 32, and having sloping outer edges 33, 34. A circumferential shoulder 36 is formed about the inside of the skirt 26 disposed at the juncture 37 of the sloping portion 28 with the skirt 26.

Figure 11:
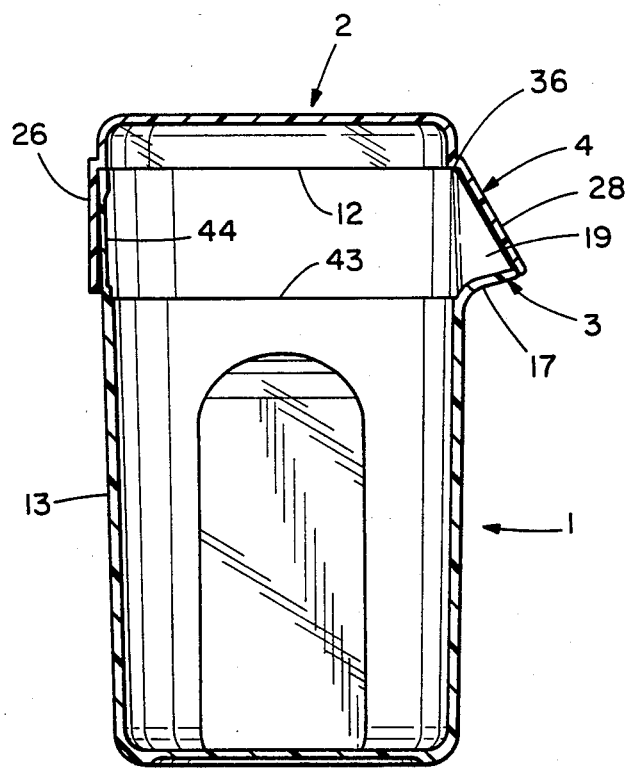
FIG. 11 is a side sectional view taken through line 11—11 of FIG. 1.

The slope and length of cover skirt portion 28 and cover edges 31, 32 is identical to the slope and length of container spout edges 22, 23. The inner diameter of the cover skirt 26 is slightly greater than the outer diameter of the container wall 13. The inner width between cover skirt extensions 29, 30 is slightly greater than the outer width between container wall extensions 18, 19. The cover spout 4 is thus complementary in shape to the container spout 3. Given this construction, the cover will slip over the container, as shown in FIGS. 1 and 11, closing both the container mouth and container spout opening, with the shoulder 36 resting atop container rim 12.

Figure 2:
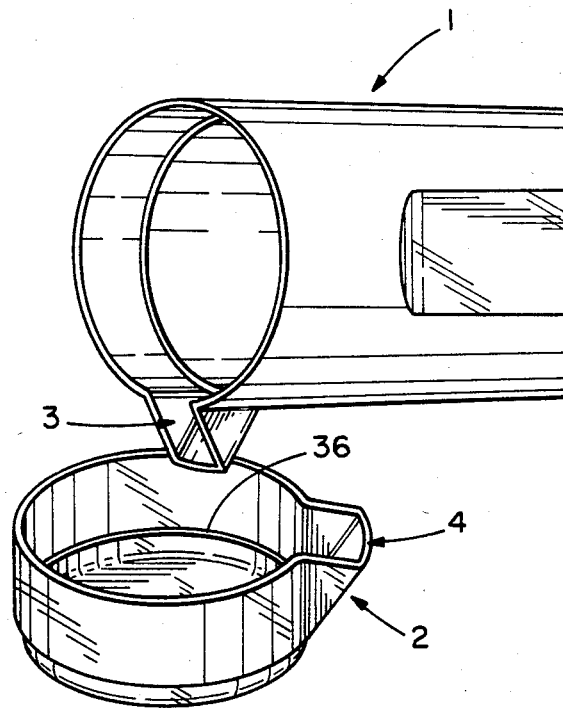
FIG. 2 is a perspective view of the container and cover of FIG. 1 separated and in position for pouring material from the container into the inverted cover.
Figure 6:
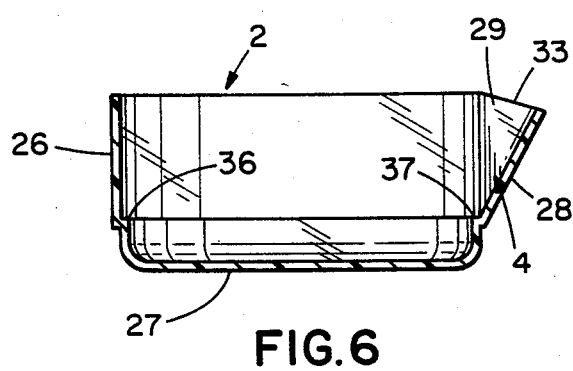
FIG. 6 is a side sectional view taken along the line 6—6 of FIG. 5.
Figure 7:
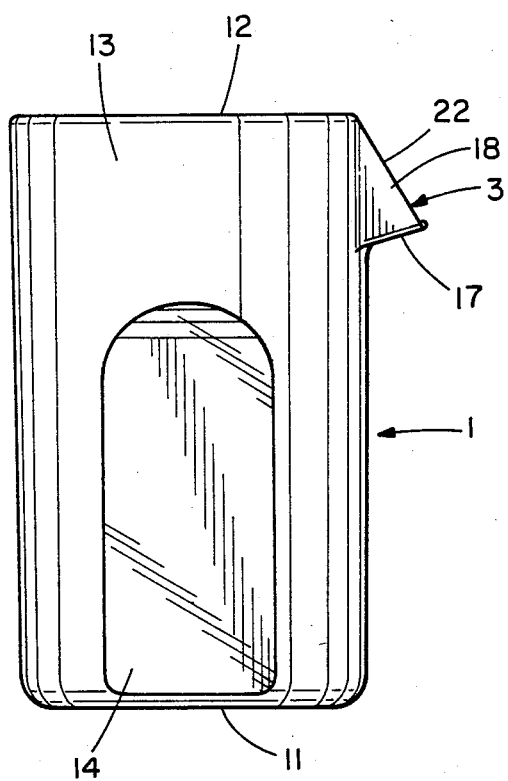
FIG. 7 is a side view of the container of FIG. 1.
Figure 8:
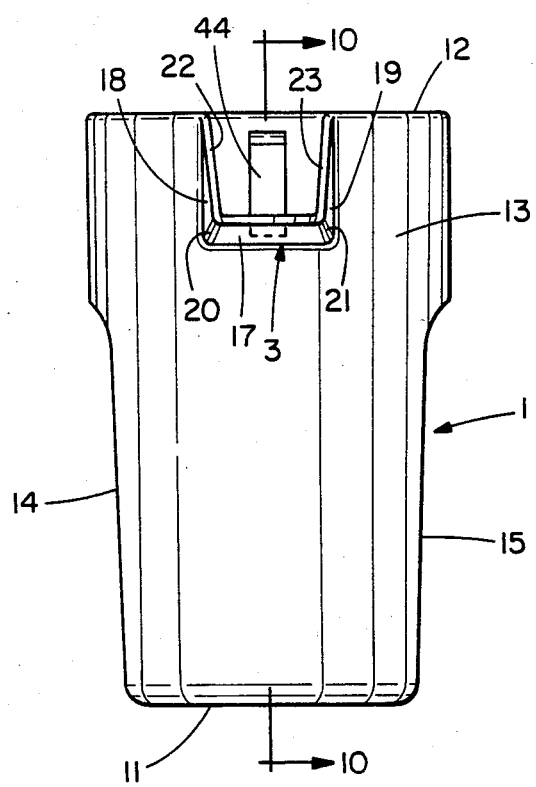
FIG. 8 is a front view of the container.
Figure 9:
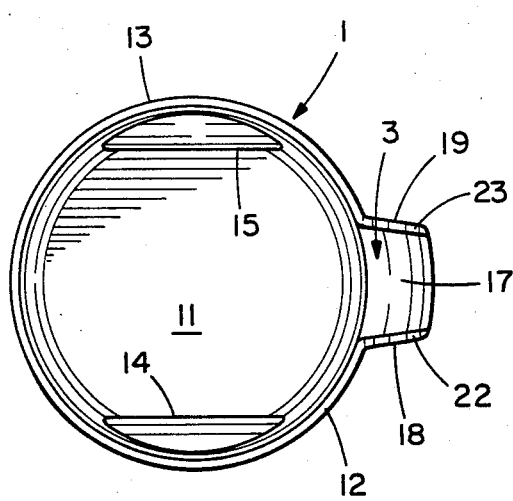
FIG. 9 is a top view of the container.

When the container 1 and cover 2 are separated, as in FIG. 2, the contents of the container 1 may be poured through the container spout 3 into the inverted cover 2. Subsequently, the contents of the cover may be poured through cover spout 4. To facilitate precise measurement, the volume defined between cover shoulder 36 and the inside of the cover bottom 27 may be selected as a pre-determined standard. The shoulder 36 will then serve as a visible indicator for dispensing the desired volume.

Figure 10:
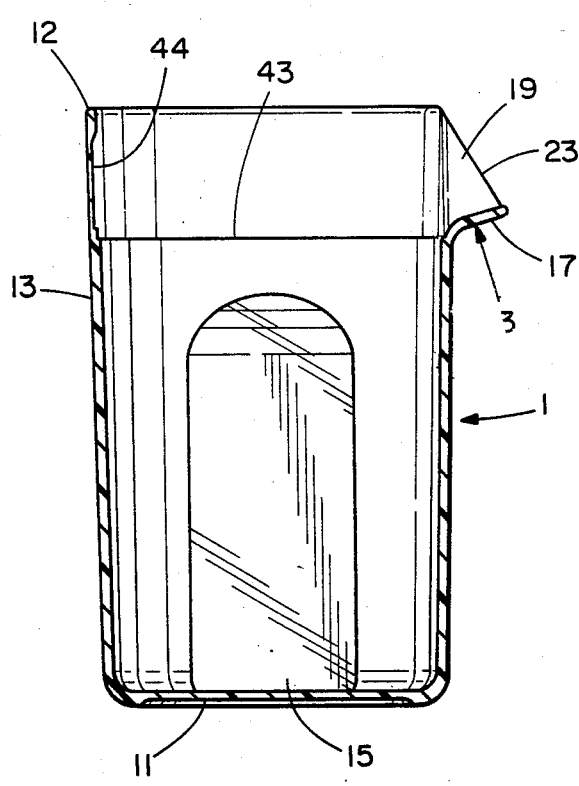
FIG. 10 is a side sectional view taken along the line 10—10 of FIG. 8.
Figure 12:
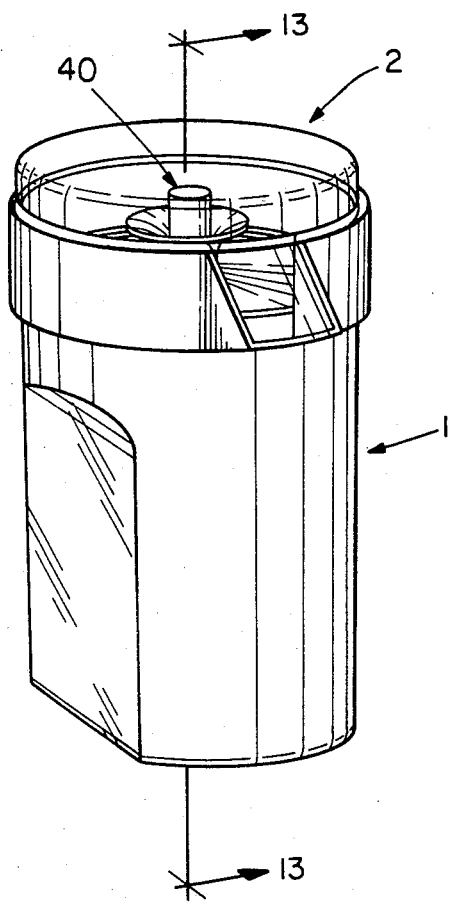
FIG. 12 is a perspective view of a container and cover combination similar to that shown in FIG. 1 but also including a secondary closure.
Figure 13:
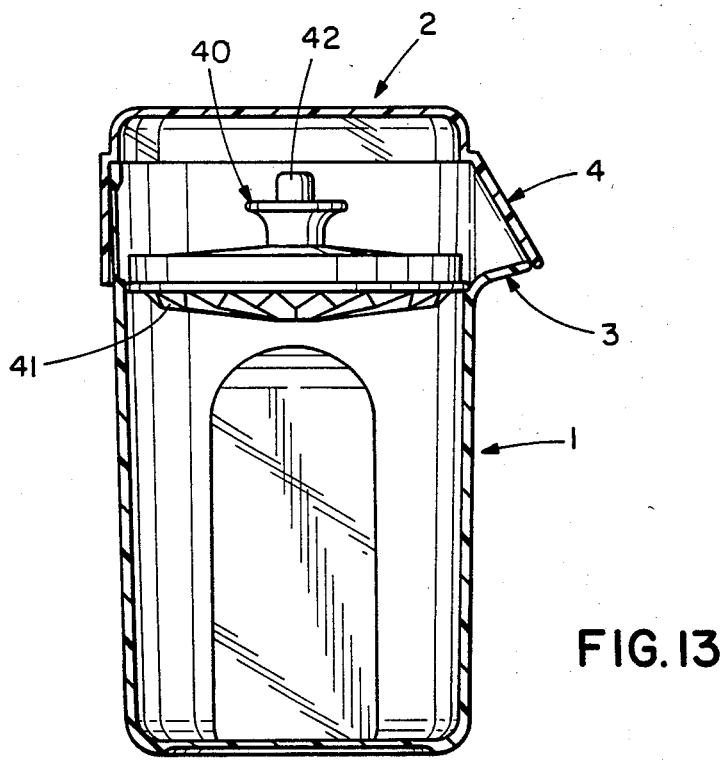
FIG. 13 is a side partially sectional view taken substantially along the line 13—13 of FIG. 12.

As shown in FIGS. 12 and 13, the container may be provided with a secondary closure 40 comprising a three-part press type seal constructed in accordance with the teaching of U.S. Pat. No. 3,756,480. That closure includes a distortable seal 41 that is selectively contracted or distended by depressing or releasing a central plunger 42. Referring also to FIG. 10, an inner circumferential ledge 43 is formed about the container wall 13 disposed below spout 3 which the edge of the seal 41 may be seated. A depressed groove 44 in the inner surface of the container wall 13 above the ledge 43 is provided to allow air to enter and escape when the secondary closure 40 is removed and inserted.

According to the preferred embodiment, all parts of the invention are made of molded plastic. It is desirable for the container, and particularly the cover, to be transparent or translucent so that the contents may be seen.

While the invention has been disclosed with reference to a specific embodiment, it should be appreciated that modifications may be made without departing from the scope of the patent warranted hereon.

We claim:

1. An improved dispensing closure for a spouted container, the container being of the type having an upright peripheral wall terminating in a top rim which circumscribes an upwardly opening wide container mouth, the container further having a container spout including an outwardly projecting portion of said wall and two upright outwardly projecting portions of said wall and two upright outwardly directed wall extensions bounding a U-shaped container spout opening formed in the upper extent of said wall, the closure including a cover having a downwardly opening in a bottom edge, the skirt having a projecting portion for covering the container spout opening, the improvement comprising:

said container wall extensions being triangular walls having out edges sloping downwardly and outwardly from said top rim, said projecting portion of said cover having an inverted spout comprising an outwardly sloping skirt portion and two upright, outwardly directed skirt extensions, said skirt extensions having outer edges sloping upwardly and outwardly from said skirt bottom edge, said skirt extensions bounding an inverted U-shaped spout opening formed in the lower extent of said skirt, said cover spout being complementary in shape to said container spout, said cover further comprising a cover bottom extending above said skirt and a circumferential shoulder disposed between said cover bottom and said skirt for resting atop said container rim, the volume of the interior of said cover bottom above said shoulder being predetermined for measuring a desired colume of material dispensed from said container, and secondary closure means disposed within said container, said secondary closure means disposed within said container, said secondary closure means comprising a three-part press type seal seatable upon a ledge formed about the inner circumference of said container wall disposed below said container spount opening.

* * * * *